United States Patent [19]

Hiraoka et al.

[11] Patent Number: 5,380,181
[45] Date of Patent: Jan. 10, 1995

[54] CONTROL DEVICE FOR AN ELECTRIC INJECTION MOLDING MACHINE

[75] Inventors: Kazuo Hiraoka; Katsuhiko Taniguchi, both of Chiba, Japan

[73] Assignee: Sumitomo Heavy Industries, Ltd., Japan

[21] Appl. No.: 79,286

[22] Filed: Jun. 21, 1993

[51] Int. Cl.6 ............................................. B29C 45/77
[52] U.S. Cl. .................................. 425/145; 264/40.7; 425/149; 425/170
[58] Field of Search ................ 425/145, 149, 170, 171; 264/40.7

[56] References Cited

U.S. PATENT DOCUMENTS

| 4,851,170 | 7/1989 | Shimizu et al. | 425/149 |
| 4,851,171 | 7/1989 | Shimizu et al. | 425/149 |
| 4,968,462 | 11/1990 | Hara | 425/145 |

FOREIGN PATENT DOCUMENTS

3286824 12/1991 Japan.

Primary Examiner—Tim Heitbrink
Attorney, Agent, or Firm—Lorusso & Loud

[57] ABSTRACT

A control device for an electric injection molding machine designed to advance and retract a screw in a heating cylinder by an injection motor includes a screw position detector for detecting a screw position to output a screw position detection signal, a speed pattern generator for generating a speed setting pattern signal which indicates relationship between time and screw speed. An integration unit integrates the speed setting pattern signal to obtain a moving stroke of the screw. And a generation unit generates a position instruction signal on the basis of the moving stroke and a screw position when injection is initiated. To generate a speed instruction signal, the screw position detection signal is subtracted from the position instruction signal as a manipulated variable of feedback and the speed setting pattern signal is applied to the position instruction signal as a manipulated variable of feed forward. Thus, accuracy at the speed changing positions can be improved, thus improving operability.

5 Claims, 10 Drawing Sheets

CONTROL DEVICE FOR AN ELECTRIC INJECTION MOLDING MACHINE

BACKGROUND OF THE INVENTION

The present invention relates to a control device for an electric injection molding machine.

In a conventional electric injection molding machine designed to advance and retract a screw by driving an injection motor, the screw is advanced in an injection process to inject a molten resin, a molding material which has been heated in a heating cylinder, into a cavity of a mold under a high pressure to fill the cavity with the molten resin. The resin in the cavity is cooled and caused to set to obtain a molded product part. Subsequently, the mold is opened to remove the molded product part.

In that case, the screw speed is changed in the injection process each time the screw has reached a predetermined position.

Figure 1:
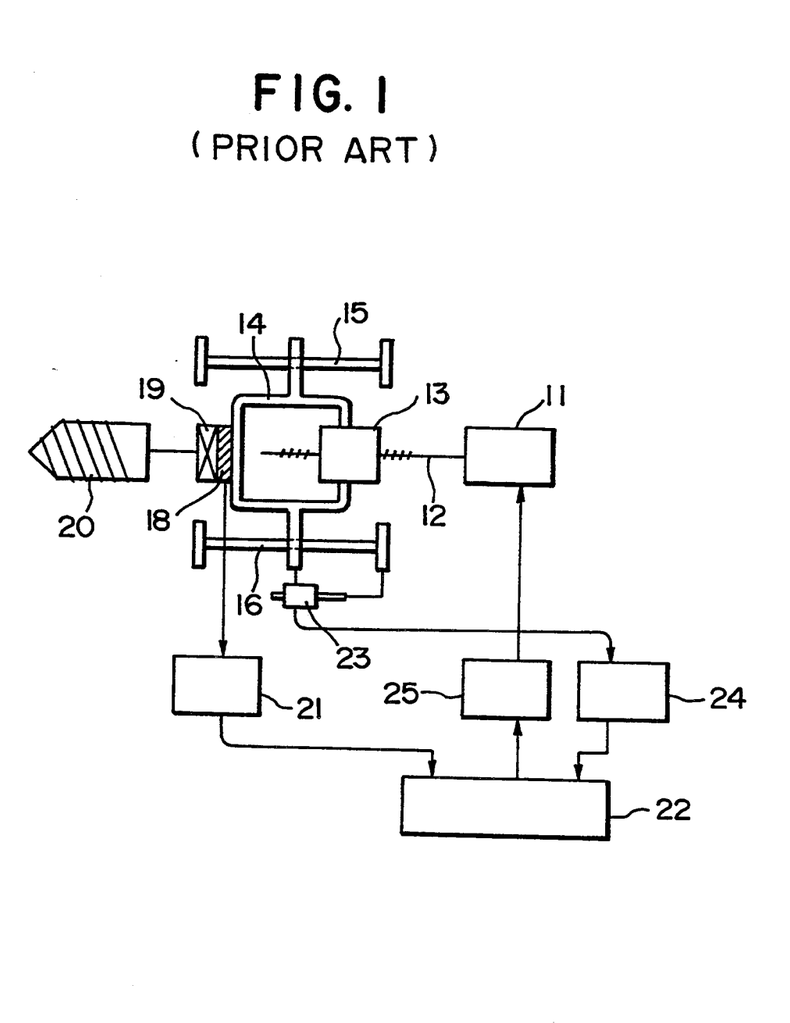
FIG. 1 shows a conventional electric injection molding machine.

FIG. 1 is a schematic view of a conventional electric injection molding machine.

In FIG. 1, a ball screw 12 is rotated by driving an injection motor 11. The ball screw 12 is threaded with a ball nut 13 formed integrally with a supporting member 14, which is in turn mounted in such a manner as to be movable along guide bars 15 and 16 mounted on a frame (not shown).

Thus, when the ball screw 12 is rotated by driving the injection motor 11, the supporting member 14 moves along the guide bars 15 and 16. The movement of the support member 14 is transmitted to a screw 20 through a load cell 18 and a bearing 19.

When the screw 20 is advanced in a heating cylinder (not shown) in the injection process, the molten resin located at the front end portion of the heating cylinder is injected into the cavity of a mold (not shown). At that time, as the screw 20 presses against the resin, a reaction force is generated and applied to the screw 20. Hence, a load cell 18 detects this reaction force, and a load cell amplifier 21 amplifies the output of the load cell 18 and inputs the amplified output to a controller 22.

To detect screw position, a screw position detector 23 is mounted between the support member 14 and the frame. An amplifier 24 amplifies the screw position detection signal of the screw position detector 23, and inputs the resultant signal to the controller 22. The controller 22 outputs a speed instruction signal determined for every process on the basis of the operator's setting value input to a servo amplifier 25 to drive the injection motor 11.

That is, to control the screw speed and dwell pressure during molding, the screw position is fed back in the injection process in which the resin is injected into the cavity of the mold, while the dwell pressure, the reaction force detected by the load cell 18, is fed back in the dwelling phase in which a fixed amount of pressure is applied to the resin filled in the cavity of the mold.

In a conventional controlling method, when the screw 20 is advanced in the injection phase, the screw speed is changed stepwise at a plurality of screw positions.

Figure 2:
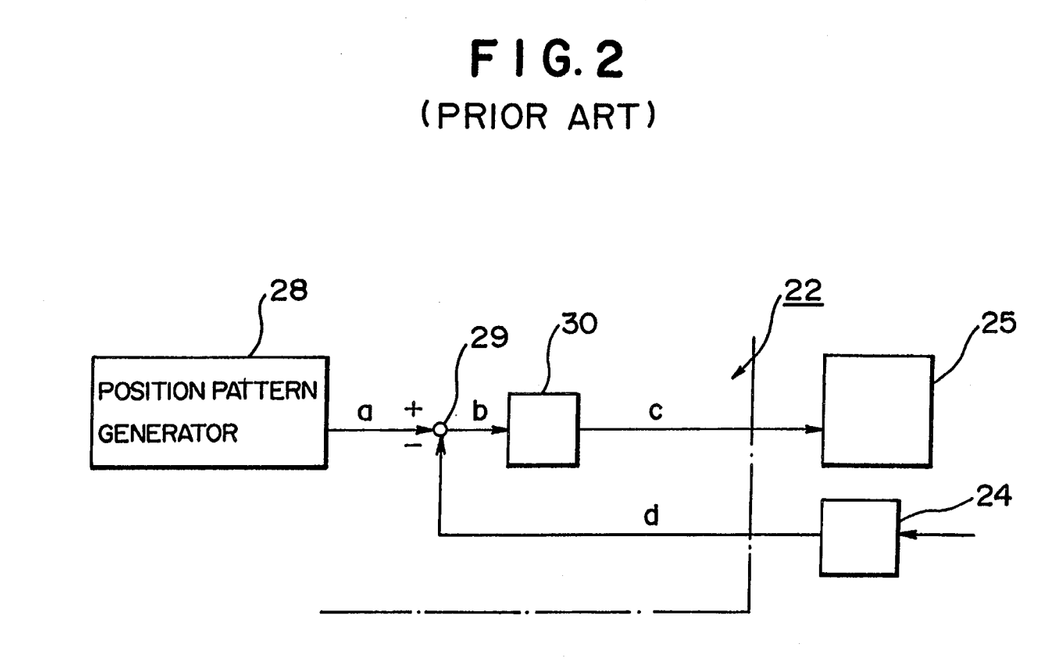
FIG. 2 is a block diagram of a control device for the conventional electric injection molding machine.

FIG. 2 is a block diagram of a control device for a conventional electric injection molding machine.

In FIG. 2, when the operator inputs changing positions and injection speeds to a position pattern generator 28 of the controller 22 from a setting unit, the position pattern generator 28 performs calculation on the basis of the set values, and generates a position setting pattern signal a. The position setting pattern signal a is generated on the basis of the relation between the changing positions and the screw speeds desired by the operator, and consists of a time signal and a screw position instruction signal.

The position setting pattern signal a is output to a subtracter 29 to which an actual screw position detection signal d is fed back from the amplifier 24. The subtracter 29 outputs a position deviation signal b to a compensator 30. The compensator 30 performs a compensation operation, and outputs a speed instruction signal c to the servo amplifier 25. In this way, the screw speed is controlled by feeding back the screw position.

In the thus-arranged control device for the electric injection molding machine, even when a normal proportional control is performed on the basis of the position setting pattern signal a, a steady-state speed deviation or an acceleration deviation may occur between the set position and the actually detected screw position, because responsiveness is low.

Thus, the operator who intends to change the screw speed by the position setting pattern signal a may not be able to change the screw speed at a desired changing position.

Consequently, the screw speed may be changed before the screw 20 (FIG. 1) has reached the operator's desired changing position.

Hence, it may be provided such that the compensator 30 contains the integration element to decrease the steady-state speed deviation or the acceleration deviation. However, this may generate overshoot or vibrations in response.

After the resin has been injected into the cavity of the mold and the injection phase has thus been completed, the dwelling phase in which the resin pressure is maintained at the set value to compensate for the shrinkage of the resin caused by cooling.

An electric injection molding machine designed to control the dwell pressure will now be described.

Figure 3:
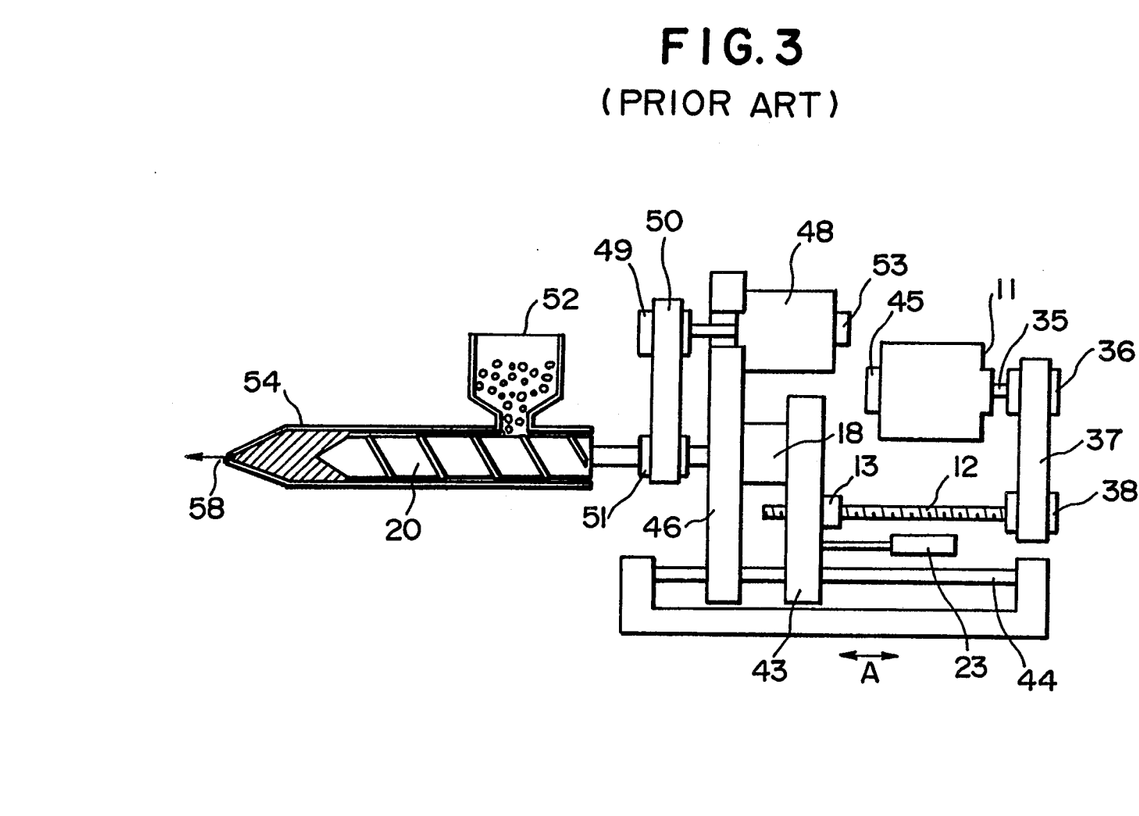
FIG. 3 shows another type of conventional electric injection molding machine.

FIG. 3 shows another type of conventional electric injection molding machine.

In FIG. 3, an output shaft 35 of the injection motor 11 is coupled to a pulley 36, which is in turn coupled to a pulley 38 through a timing belt 37. A ball screw 12 is integrally mounted on the pulley 38. The ball screw 12 is threaded with a ball nut 13.

The ball nut 13 is fixed to a plate 43, which is movable along a guide bar 44 in a direction indicated by an arrow A. A screw position detector 23 detects a screw position. The rotational speed of the injection motor 11 is detected by a speed detector 45.

The plate 13 is formed integrally with a plate through a load cell 18. A screw 20 is rotatably mounted on the plate 46. The plates 43 and 46 are movable along the guide bar 44 in the direction indicated by the arrow A.

A screw rotating motor 48 is mounted on the plate The rotation generated by the screw rotating motor 48 is transmitted to the screw 20 through a pulley 49, a timing belt 50 and then a pulley 51. The rotational speed of the screw rotating motor 48 is detected by a speed detector 53.

Reference numeral 52 denotes a hopper for accommodating resin pellets, reference numeral 54 denotes a heating cylinder, and reference numeral 58 denotes an injection nozzle through which the resin is injected.

The operation of the above-described electric injection molding machine will be described below.

In the metering process, the rotation generated by driving the screw rotating motor 48 is transmitted to the screw 20 through the pulley 49, the timing belt 50 and then the pulley 51. Consequently, the screw 20 retracts and the resin supplied from the hopper 52 is melted and accumulated in the front end portion of the heating cylinder 54.

At that time, a rotation is applied to the ball screw 12 through the pulley 36, the timing belt 37 and then the pulley 38 to apply a back pressure to the screw through the ball nut 13, the plate 43, the load cell 18 and then the plate 46. After this back pressure has reached an adequate value, the amount of resin accumulated in the front end portion of the heating cylinder 54 increases gradually due to retraction of the screw 20.

At that time, the screw position detector 23 detects the screw position by detecting the position of the plate 43. When the screw 20 has retracted to a preset position, the operation of the screw rotating motor 48 and the operation of the injection motor 11 are halted, thereby completing the metering process.

In a subsequent injection process, the injection motor 11 is controlled according to the speed setting value under the condition that the screw rotating motor 48 is not rotated. Thus, the screw 20 is advanced without being rotated to inject the resin into the cavity of the mold (not shown) from the injection nozzle 58.

When the reaction force detected by the load cell 18 provided between the plates 43 and 46 exceeds the set value, filling is stopped and the dwell process starts. In the dwelling process, the load cell 18 detects the dwell pressure. Therefore, the injection motor 11 is controlled such that the dwell pressure equals the set value.

Figure 4:
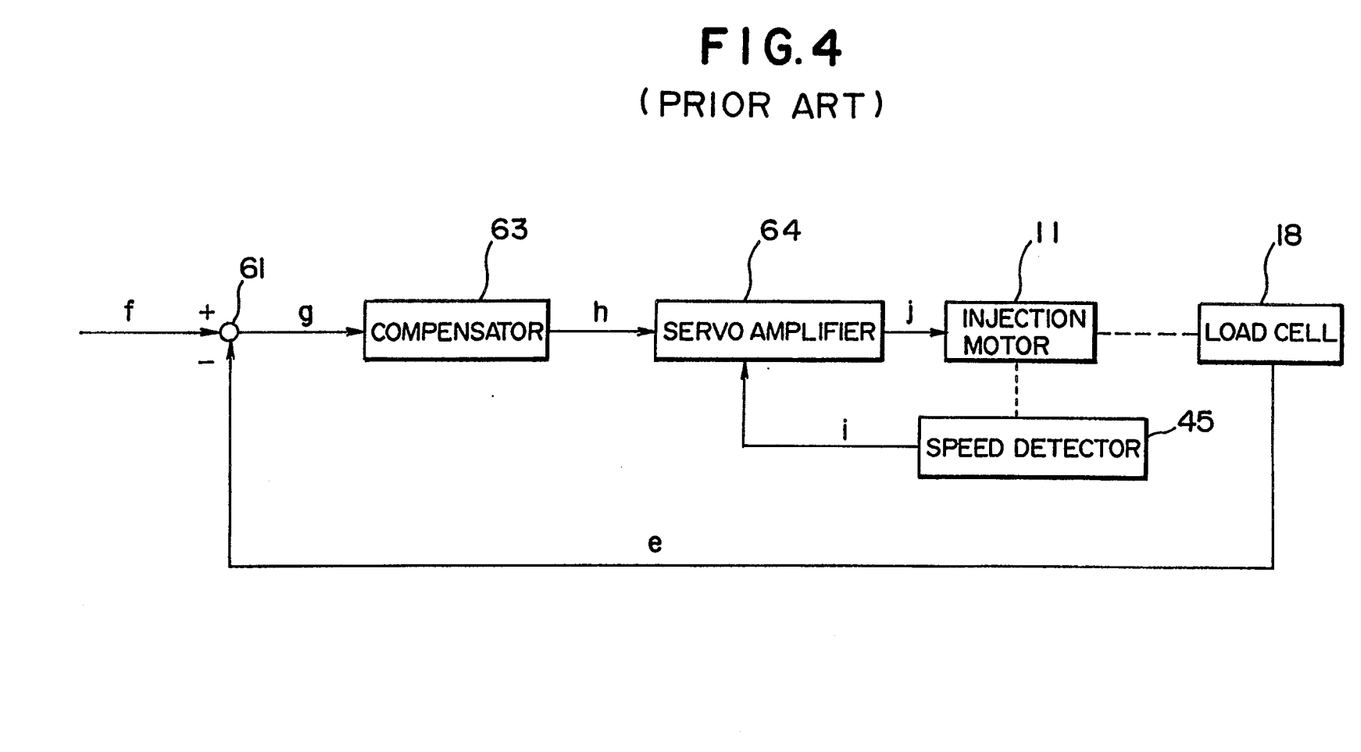
FIG. 4 is a block diagram of a control device of another type of conventional electric injection molding machine.

FIG. 4 is a block diagram of a control device for another type of conventional electric injection molding machine.

In FIG. 4, reference numeral 11 denotes an injection motor, and reference numeral 18 denotes a load cell for detecting the dwell pressure after filling is completed. The dwell pressure detected by the load cell 18 is fed back to a subtracter 61 as a pressure detection signal e. The subtracter 61 subtracts the pressure detection signal e from a pressure setting signal f to obtain a pressure deviation signal g. The pressure deviation signal g is supplied to a compensator 63.

The resultant signal of the compensator 63 is output to a servo amplifier 64 as a speed instruction signal h. The servo amplifier 64 controls armature current j of the injection motor 11 such that the speed instruction signal h equals rotational speed detection signal i detected by the speed detector 45.

Thus, when the screw 20 (FIG. 3) presses against the resin in the heating cylinder 54 and cavity (not shown), a reaction force is received by the screw 20 as a dwell pressure. The load cell 18 detects this dwell pressure as the pressure detection signal e. Control is performed such that the pressure detection signal e equals the pressure setting signal f.

However, in the control device for another type of conventional electric injection molding machine, overshoot may occur or a steady-state deviation may increase at a changing point of the pressure setting signal f.

Figure 5:
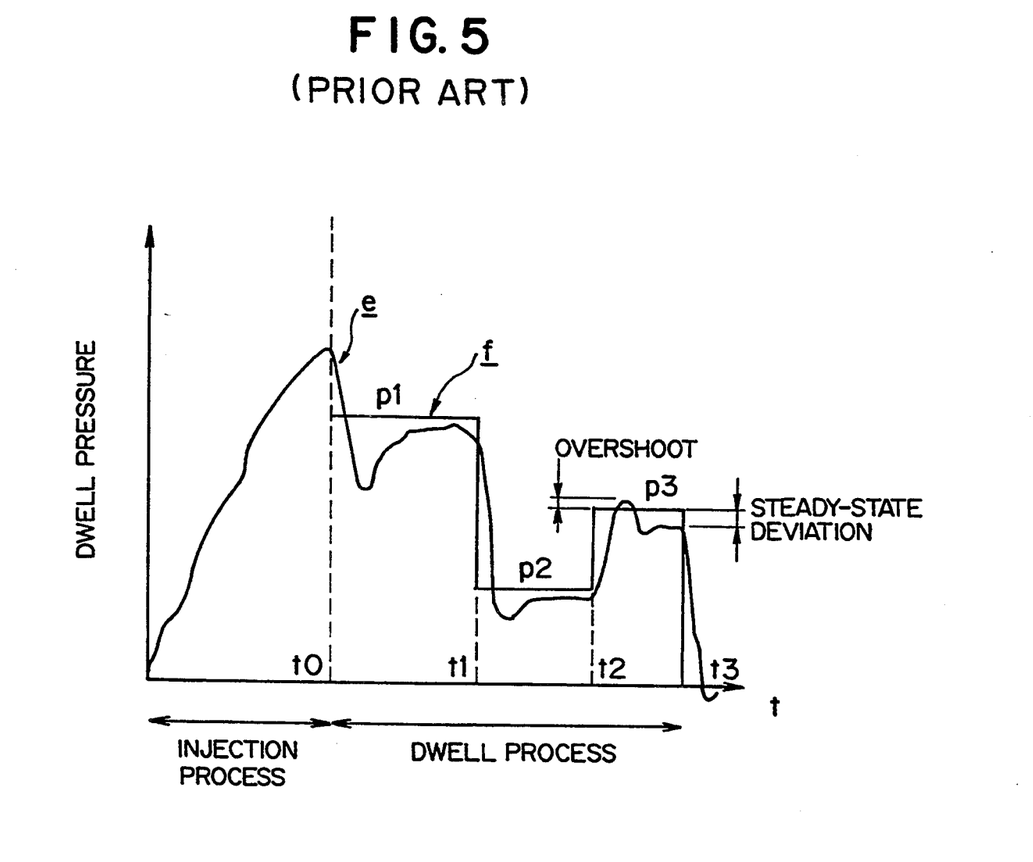
FIG. 5 shows the waveform of a pressure setting signal and the waveform of a pressure detection signal in the dwell process.

FIG. 5 shows the waveform of the pressure setting signal and that of the speed detection signal in the dwell process.

In FIG. 5, t0 through t3 represent points along a time axis t, and P1 through P3 represent the values of the pressure setting signal f set at time points t0, t1 and t2, respectively.

The pressure detection signal e in the injection process has a waveform determined by both the screw speed and the load pressure. When the above-described pressure control operation is initiated in the dwell process, overshoot may occur or a steady-state deviation may increase at the changing point of the pressure setting signal f.

Hence, in order to prevent occurrence of overshoot, gain may be reduced. However, this increases the steady-state deviation or slows down response.

Conversely, an increase in the gain, which is conducted in order to reduce the steady-state deviation and thereby speed up response, makes the control system unstable in a transient state due to influence of the non-linearity of the control system, generating vibrations or overshoot.

SUMMARY OF THE INVENTION

In view of the aforementioned problems of a conventional control device for an electric injection molding machine, an object of the present invention is to provide a control device for an electric injection molding machine which enables changing accuracy at a speed changing position to be improved, thus improving operability, and which can eliminate generation of an overshoot and any increase in a steady-state deviation at a changing point of a pressure setting signal in a dwell process.

To achieve the above object, the present invention provides a control device for an electric injection molding machine designed to advance and retract a screw in a heating cylinder by an injection motor, which comprises a screw position detector for detecting a screw position to output a screw position detection signal, and a speed pattern generator for generating a speed setting pattern signal which indicates a relation between a point in time and speed.

The control device further comprises integration means for integrating the speed setting pattern signal to obtain a moving stroke of the screw, generation means for generating a position instruction signal on the basis of the moving stroke and a screw position when injection is initiated, and means for subtracting the screw position detection signal from the position instruction signal as a manipulated variable of feedback and for adding the speed setting pattern signal to the position instruction signal as a manipulated variable of feed forward to generate a speed instruction signal.

Thus, response can be improved and no steady-state deviation between the screw speed changing position and an actual screw position occurs. Consequently, changing accuracy can be improved, improving operability.

In order to store the screw position signal when injection is initiated, a screw position storing device may be provided. In that case, the position instruction signal can be generated by adding the moving stroke to the screw position signal.

In the control device for an electric injection molding machine, the screw position detection signal is supplied to the position instruction signal as a manipulated variable of feed back by a subtracter, and the speed setting pattern signal is supplied to the position instruction signal as a manipulated variable of feed forward by an adder.

The present invention further provides a control device for an electric injection molding machine designed to advance and retract a screw in a heating cylinder by an injection motor, which comprises pressure detection means for detecting a reaction force received by the screw to generate a pressure detection signal, a pressure pattern generator for generating a pressure instruction signal having a first order lag waveform upon receipt of a pressure setting signal having a stepped waveform, and means for subtracting the pressure detection signal from the pressure instruction signal as a manipulated variable of feedback to generate a speed instruction signal.

Thus, even in a transient state which occurs at a point where the pressure setting signal rises or falls stepwise, the pressure instruction signal is substantially equal to the pressure detection signal, and influence of nonlinearity can thus be ignored. Also, no overshoot occurs, and steady-state deviation is not increased. Consequently, excellent pressure control characteristics can be obtained, and a high-quality product can be obtained.

BRIEF DESCRIPTION OF THE DRAWINGS

The structures and features of the invention will be apparent from the following description taken in connection with the accompanying drawings wherein.

DESCRIPTION OF PREFERRED EMBODIMENT

Embodiments of the present invention will be described below with reference to the accompanying drawings.

Figure 6:
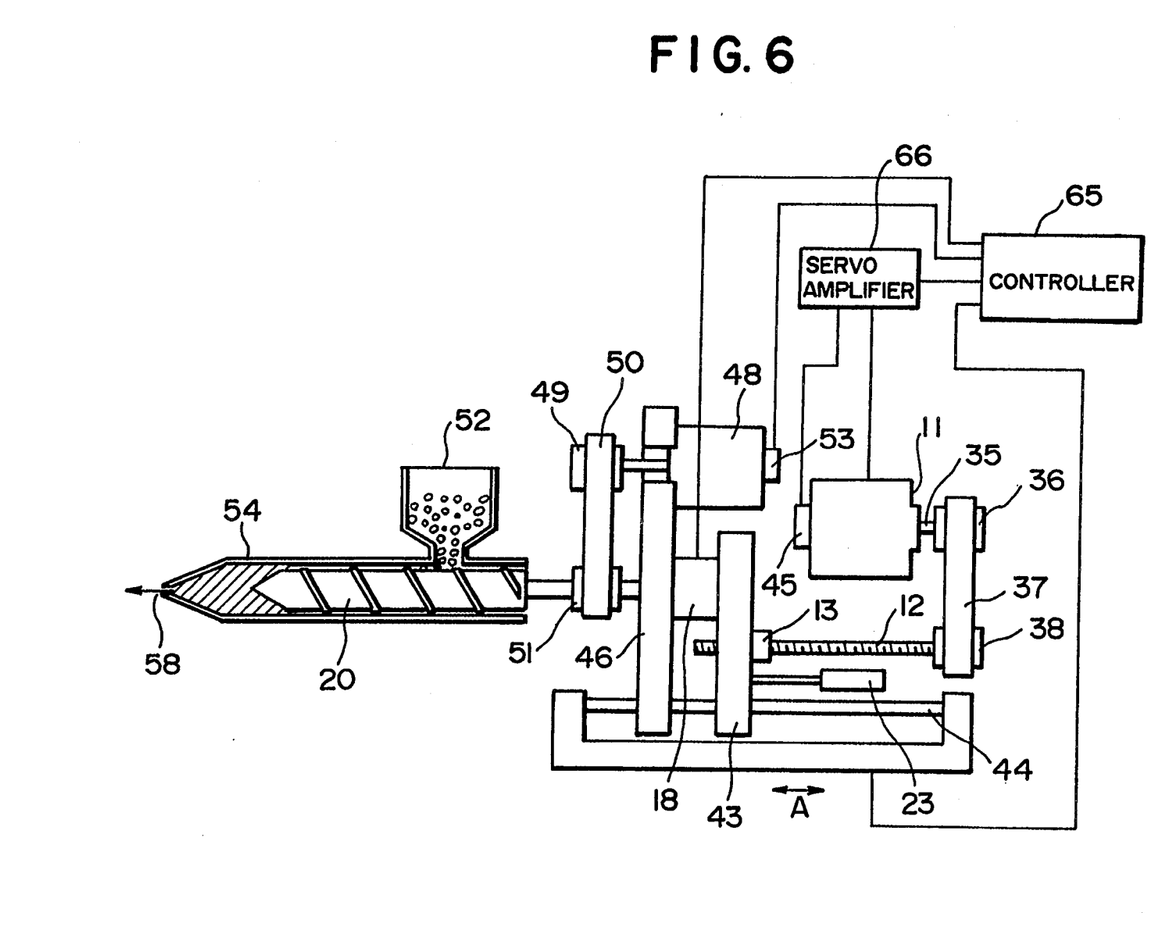
FIG. 6 shows an electric injection molding machine to which the present invention is applied.

In FIG. 6, the output shaft 35 of the injection motor 11 is coupled to the pulley 36, which is in turn coupled to the pulley 38 through the timing belt 37. The ball screw 12 is integrally mounted on the pulley 38. The ball screw 12 is threaded with the ball nut 13.

The ball nut 13 is fixed to the plate 43, which is movable along the guide bar 44 in the direction indicated by the arrow A. The screw position detector 23 detects a screw position. The rotation speed of the injection motor 11 is detected by the speed detector 45.

The plate 43 is formed integrally with the plate through the load cell 18 which is a pressure detection means. The screw 20 is rotatably mounted on the plate 46. The plates 43 and 46 are movable along the guide bar 44 in the direction indicated by the arrow A.

The screw rotating motor 48 is mounted on the plate 46. The rotation generated by the screw rotating motor 48 is transmitted to the screw 20 through the pulley 49, the timing belt 50 and then the pulley 51. The rotational speed of the screw rotating motor 48 is detected by the speed detector Reference numeral 52 denotes a hopper for accommodating resin pellets, reference numeral 54 denotes a heating cylinder, reference numeral 58 denotes an injection nozzle through which the resin is injected, reference numeral 65 denotes a controller and reference numeral 66 denotes a servo amplifier.

The operation of the above-described electric injection molding machine will be described below.

In the metering process, the rotation generated by driving the screw rotating motor 48 is transmitted to the screw 20 through the pulley 49, the timing belt 50 and then the pulley 51. Consequently, the screw 20 retracts and the resin supplied from the hopper 52 is melted and accumulated in the front end portion of the heating cylinder 54.

At that time, the ball screw 12 is rotated through the pulley 36, the timing belt 37 and then the pulley 38 to apply a back pressure to the screw through the ball nut 13, the plate 43, the load cell 18 and then the plate 46. After this back pressure has reached an adequate value, the amount of resin accumulated in the front end portion of the heating cylinder 54 gradually increases due to retraction of the screw 20.

At that time, the screw position detector 23 detects the screw position by detecting the position of the plate 43. When the screw 20 has retracted to a preset position, the operation of the screw rotating motor 48 and the operation of the injection motor 11 are halted, thereby completing the measuring process.

In a subsequent injection process, the injection motor 11 is controlled according to the speed setting value under the condition that the screw rotating motor 48 is not rotated. Thus, the screw 20 is advanced without being rotated to inject the resin into the cavity of the mold (not shown) from the injection nozzle 58.

When the reaction force detected by the load cell 18 provided between the plates 43 and 46 exceeds a set value, filling is stopped and the dwell process is started. In the dwelling process, the load cell 18 detects the dwell pressure. Therefore, the injection motor 11 is controlled such that the dwell pressure equals the set value.

A control device for the thus-arranged electric injection molding machine will be described below with reference to FIGS. 6, 7 and 8.

In this control device, speed control in feed forward is performed in addition to position control feed back in order to achieve changing of the screw speed without a delay.

Figure 7:
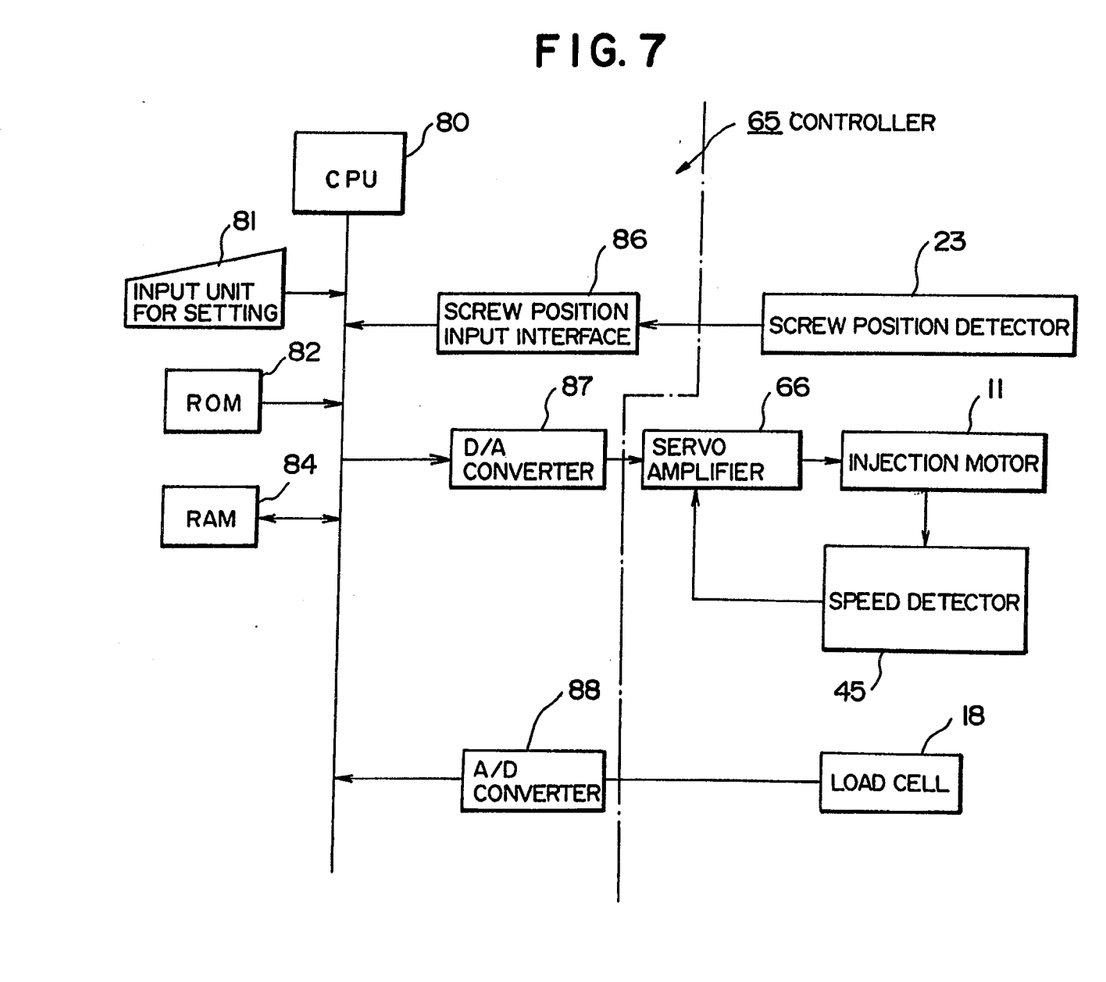
FIG. 7 is a schematic view of a first embodiment of a control device for an electric injection molding machine according to the present invention.

As shown in FIG. 7, the controller 65 includes a CPU 80, an input unit for setting 81, a ROM 82, a RAM 84, a screw position input interface 86, a D/A converter 87 and an A/D converter 88. The operator can input, from the input unit for setting 81, various setting values, including the changing position, the screw speed, the pressure setting value and so on.

When screw position is detected by the screw position detector 23, a resultant screw position detection signal is input to the CPU 80 through the screw position input interface 86. When the rotational speed of the injection motor 11 is detected by the speed detector 45, a resultant speed detection signal is input to the servo amplifier 66. When a dwell pressure is detected by the load cell 18, a resultant pressure detection signal is input to the CPU 80 through the A/D converter 88.

Figure 8:
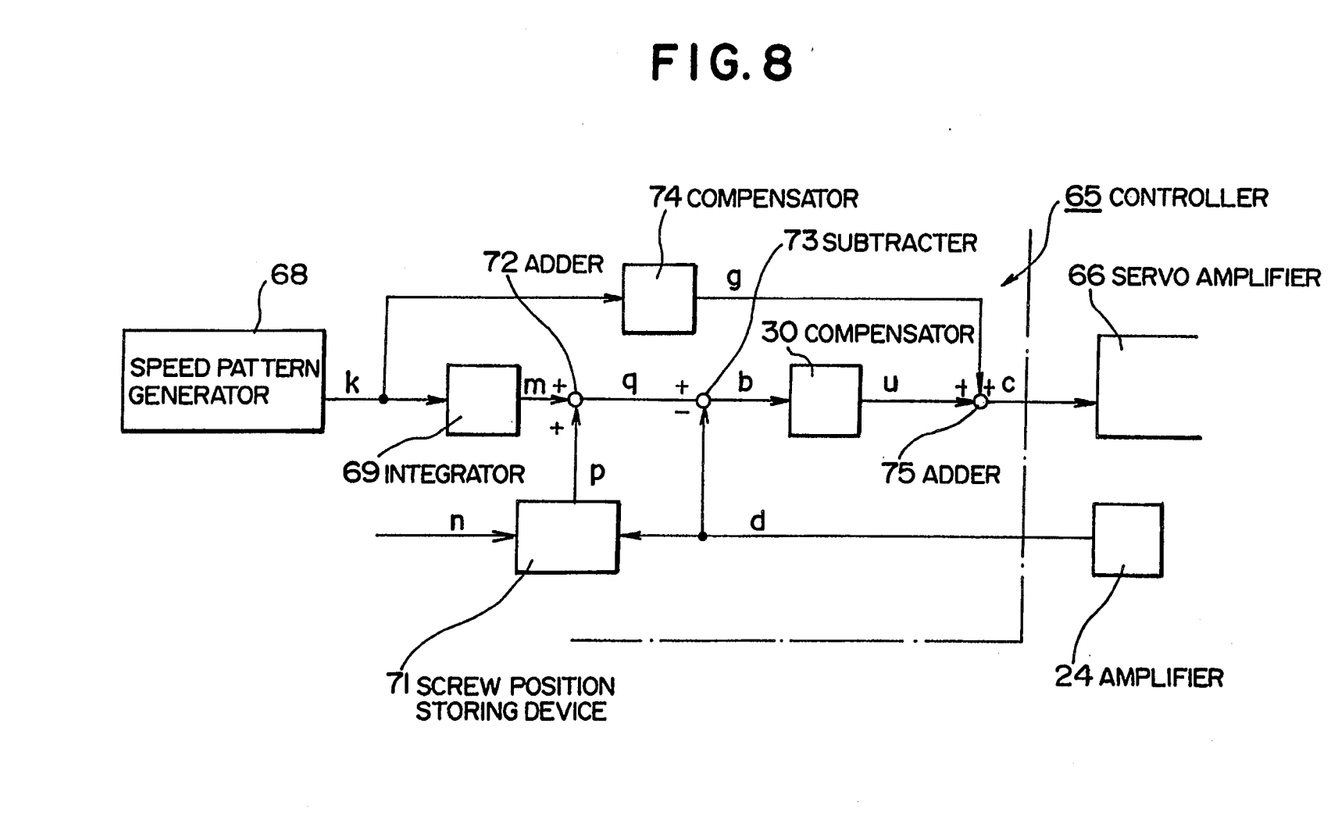
FIG. 8 is a block diagram of the first embodiment of the control device shown in FIG. 7.

In FIG. 8, reference numeral 24 denotes an amplifier for amplifying a screw position detection signal from the screw position detector 23 (FIG. 6), reference numeral 65 denotes the controller; and reference numeral 66 denotes the servo amplifier.

When the operator sets the changing position and the screw speed from the input unit for setting 81 (FIG. 7) connected to the controller 65, a speed pattern generator 68 generates a speed setting pattern signal k on the basis of the set values. In that case, the speed setting pattern signal k is generated on the basis of the relation between the time and the screw speed, and is output as a screw speed signal at predetermined time intervals after the injection process has been initiated. The speed setting pattern signal k is input to an integrator 69 serving as integration means. The integrator 69 performs integration on the signal k, and outputs a moving stroke signal m. Since the moving stroke signal m is an integral of the speed setting pattern signal k, it represents the screw position at a specific point, i.e., the moving stroke of the screw 20 from the injection starting position. When the start of the injection process is recognized, a sequence processing device (not shown) in the controller 65 outputs an injection starting signal n to a screw position storing device 71. When the screw position storing device 71 receives the injection starting signal n when the injection process is initiated, it stores a screw position detection signal d, holds it throughout the injection process and outputs it, as an initial screw position signal p, to an adder 72.

The adder 72 adds the initial screw position signal to the moving stroke signal m. Since the initial screw position signal p represents the screw position when the injection process is initiated while the moving stroke signal m represents the stroke distance from the initial screw position which varies with time, a position instruction signal q is obtained as the result of the addition of the adder 72. The position instruction signal q corresponds to the position setting pattern signal a output from the position pattern generator 28 (see FIG. 2) in the control device of a conventional electric injection molding machine.

The position instruction signal q is output to a subtracter 73 to which the screw position detection signal d is fed back. The subtracter 73 outputs the position deviation signal b. The compensator 30 performs the compensation operation on the position deviation signal b, and generates a signal u, a manipulated variable in a position control system to the servo amplifier 66.

The speed setting pattern signal k is likewise input to a compensator 72. The compensator 72 performs compensation on the signal k, and generates a signal g. An adder 75 adds the signal g to the signal u, and generates a speed instruction signal c fed to the servo amplifier 66.

In that case, changing of the speed without a delay is accomplished by inputting the speed instruction signal c to the servo amplifier 66. In a control operation which employs only the signal g, as the time elapses, a deviation occurs between the actual value and the set value in terms of the time, screw position or screw speed due to a disturbance, such as an error at the gain zero point on a circuit or the reaction applied by the resin to the screw 20. In this invention, switch-over of the speed without a delay is achieved by correcting the signal g using the signal u, thus achieving highly accurate speed control.

Although the compensator 72 requires a system reverse to the speed feed back system, a mere proportional compensator may be used as the compensator 74.

A second embodiment of the present invention will be described below.

Figure 9:
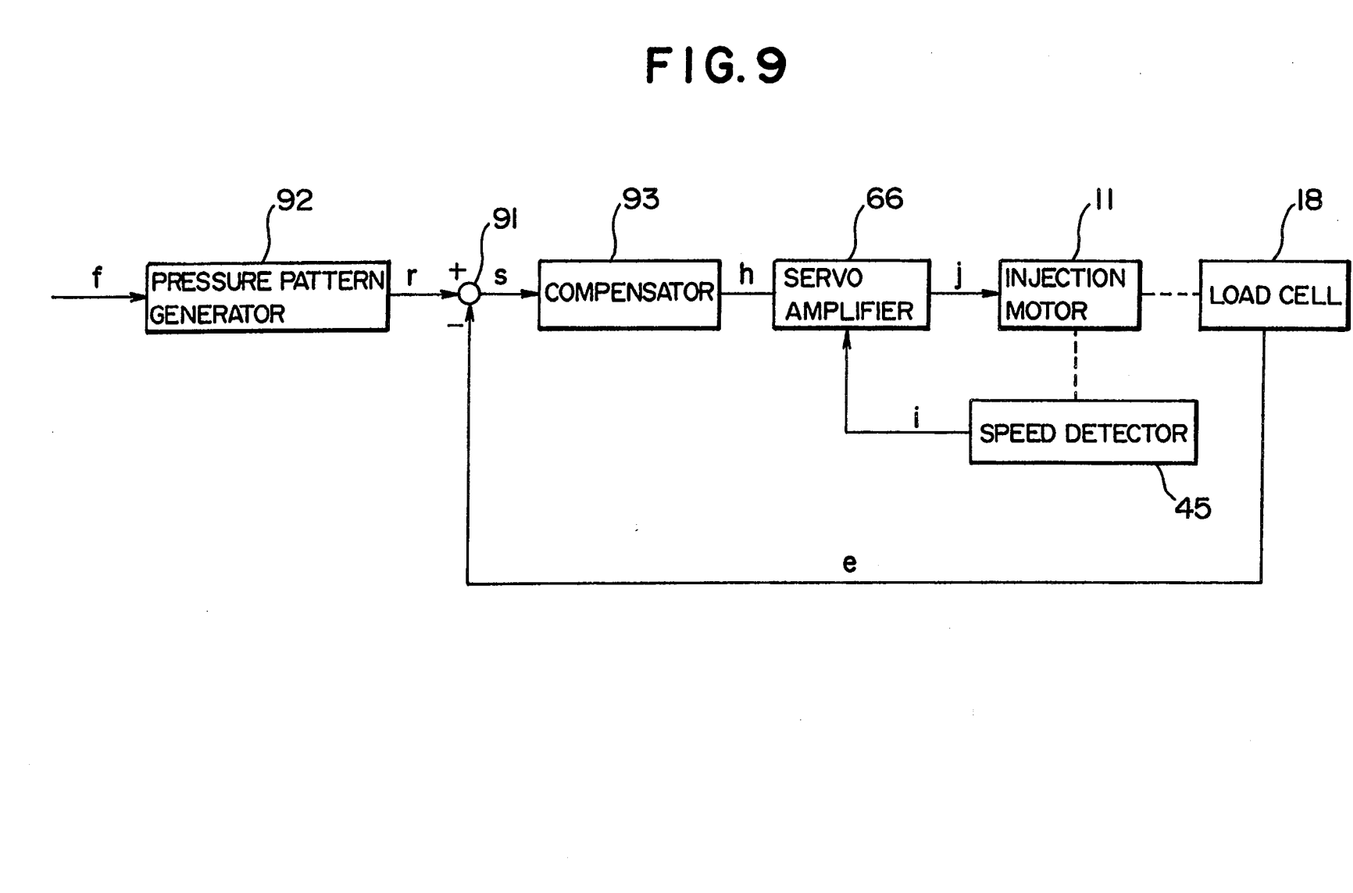
FIG. 9 is a block diagram of a second embodiment of a control device for an electric injection molding machine according to the present invention.

In FIG. 9, reference numeral 11 denotes an injection motor, and reference numeral 18 denotes a load cell for detecting dwell pressure after filling has been completed. The dwell pressure detected by the load cell 18 is fed back to a subtracter 91 as a pressure detection signal e. The subtracter 91 subtracts the pressure detection signal e from a pressure instruction signal r output from a pressure pattern generator 92, and outputs a pressure deviation signal s to a compensator 93.

The resultant signal of the compensator 93 is output to a servo amplifier 66 as a speed instruction signal h. The servo amplifier 66 controls armature current j of the injection motor 11 such that the speed instruction signal h equals to a rotational speed detection signal i detected by the speed detector 45.

Thus, when the screw 20 (FIG. 6) presses against the resin in the heating cylinder 54 and cavity (not shown), a reaction force is received by the screw 20 as a dwell pressure. The load cell 18 detects that dwell pressure as the pressure detection signal e. Control is performed such that the pressure detection signal e is equal to the pressure instruction signal r.

The pressure instruction signal r is generated by the pressure pattern generator 92 to which a pressure setting signal f is input.

The pressure pattern generator 92 has the function of a filter, and generates a first order lag signal waveform by deforming the pressure setting signal waveform which has been set stepwise by a pressure program, such as a dwell pressure setting program or a back pressure setting program.

Figure 10:
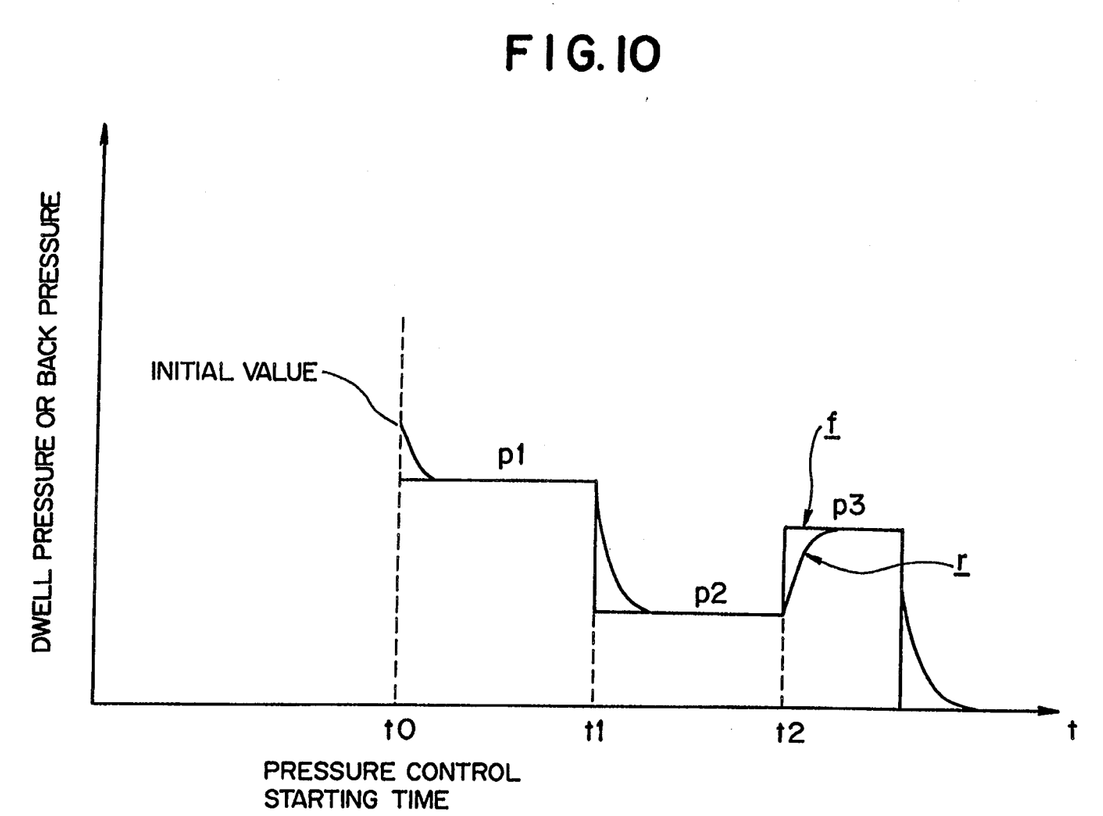
FIG. 10 shows the waveform of a pressure setting signal and the waveform of a pressure instruction signal in the second embodiment of the present invention.

FIG. 10 shows the waveform of the pressure setting signal and the waveform of the pressure instruction signal in the second embodiment of the present invention.

In FIG. 10, t0 through t3 represent points along a time axis t, and P1 through P3 represent values of the pressure setting signal f set at points t0, t1 and t2, respectively.

Whereas the pressure setting signal f is set stepwise by the pressure program, the pressure instruction signal r output from the pressure pattern generator 92 (FIG. 9) has a waveform of first order lag.

In a conventional electric injection molding machine, since it is impossible for the control system to follow the set value of a stepped waveform, overshoot may occur or steady-state deviation may increase at the changing point of the pressure setting signal f. This adversely affects the non-linearity of the control system, generating vibrations.

In the control device of the electric injection molding machine according to the present invention, if the rising speed is within a physically trackable range which is achieved by setting the parameters appropriately, the pressure instruction signal r is substantially equal to the pressure detection signal e even in a transient state, enabling influence of the non-linearity to be ignored.

Thus, the gain can be increased, and an excellently responding waveform can be obtained without causing a steady-state deviation.

While the present invention has been described with respect to what is presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A control device for an electric injection molding machine designed to advance and retract a screw in a heating cylinder by an injection motor, said control device comprising:
   (a) a screw position detector for detecting a screw position to output a screw position detection signal;
   (b) a speed pattern generator for generating a speed setting pattern signal which indicates a relation between a time and a screw speed;
   (c) integration means for integrating the speed setting pattern signal to obtain a stroke of said screw;
   (d) generation means for generating a position instruction signal on the basis of the stroke and the screw position when injection is initiated;
   (e) means for subtracting the screw position detection signal from the position instruction signal, as a manipulated variable of feedback, to generate a position deviation signal; and
   (f) means for adding the speed setting pattern signal to the position deviation signal, as a manipulated variable of feed forward, and for generating a speed instruction signal.

2. A control device for an electric injection molding machine according to claim 1, further comprising a screw position storing device for storing the screw position detection signal when injection is initiated.

3. A control device for an electric injection molding machine according to claim 1, further comprising means for compensating said speed setting pattern signal, prior to addition to the position deviation signal, and means for compensating said position deviation signal, prior to addition to the compensated speed setting pattern signal.

4. A control device for an electric injection molding machine designed to advance and retract a screw in a heating cylinder by an injection motor, said control device comprising:
   (a) pressure detection means for detecting a reaction force on the screw to generate a pressure detection signal;
   (b) a pressure pattern generator for generating a pressure instruction signal, having a first order lag waveform, upon receipt of a pressure setting signal having a stepped waveform; and
   (c) means for subtracting the pressure detection signal from the pressure instruction signal, as a manipulated variable of feedback, to generate a pressure deviation signal.

5. A control device for an electric injection molding machine according to claim 4 further comprising means for compensating the pressure deviation signal to produce a speed instruction signal.

* * * * *

UNITED STATES PATENT AND TRADEMARK OFFICE
CERTIFICATE OF CORRECTION

PATENT NO. : 5,380,181  
DATED : January 10, 1995  
INVENTOR(S) : HIRAOKA et al

Page 1 of 2

It is certified that error appears in the above-indentified patent and that said Letters Patent is hereby corrected as shown below:

Col. 2, line 30, delete "such";

line 55, delete "13" and insert --43-- and after "plate" insert --46--; and line 59, after "plate" insert --46--.

Col. 3, line 10, delete "a".

Col. 4, line 42, after "and" insert --screw--.

Col. 5, line 67, delete "rotation" insert --rotational--.

Col. 6, line 1, after "plate" insert --46--; and line 11, after "detector" insert --53--.

Col. 7, line 40, after "signal" insert --p--;

line 60, delete "72", both instances, and insert --74--, both instances.

UNITED STATES PATENT AND TRADEMARK OFFICE
CERTIFICATE OF CORRECTION

PATENT NO. : 5,380,181
DATED : January 10, 1995
INVENTOR(S) : HIRAOKA et al

It is certified that error appears in the above-indentified patent and that said Letters Patent is hereby corrected as shown below:

Col. 8, line 8, delete "72" and insert --74--; and line 26, delete "to a".

Signed and Sealed this

Twenty-eighth Day of November 1995

Attest:

BRUCE LEHMAN

*Attesting Officer*  *Commissioner of Patents and Trademarks*